(12) United States Patent
Jean

(10) Patent No.: US 9,959,216 B2
(45) Date of Patent: May 1, 2018

(54) GENERATING AND USING AN ENHANCED INITIALIZATION VECTOR

(71) Applicant: Sebastien A. Jean, San Jose, CA (US)

(72) Inventor: Sebastien A. Jean, San Jose, CA (US)

(73) Assignee: SanDisk Technologies LLC, Plano, TX (US)

( * ) Notice: Subject to any disclaimer, the term of this patent is extended or adjusted under 35 U.S.C. 154(b) by 79 days.

(21) Appl. No.: 14/022,779

(22) Filed: Sep. 10, 2013

(65) Prior Publication Data

US 2015/0074426 A1 Mar. 12, 2015

(51) Int. Cl.
| G06F 11/30 | (2006.01) |
| G06F 12/14 | (2006.01) |
| H04L 9/06 | (2006.01) |
| G06F 21/60 | (2013.01) |
| G06F 21/79 | (2013.01) |

(52) U.S. Cl.
CPC ........ *G06F 12/1408* (2013.01); *G06F 21/602* (2013.01); *G06F 21/79* (2013.01); *H04L 9/0637* (2013.01); *G06F 2212/214* (2013.01)

(58) Field of Classification Search
CPC ............. G06F 21/78; G06F 2221/2107; G06F 3/0623; G06F 3/0658; G06F 3/0679; G06F 12/1408; G06F 21/79; G06F 21/602; G06F 2212/214; H04L 9/088; G11B 20/00086; G11B 20/00115; G11B 20/00152; G11B 20/0021

USPC .......................................................... 713/193
See application file for complete search history.

(56) References Cited

U.S. PATENT DOCUMENTS

| 2005/0120260 A1* | 6/2005 | Suzuki et al. .................... 714/5 |
| 2005/0235148 A1* | 10/2005 | Scheidt ................... G06F 21/31 713/168 |
| 2008/0272194 A1* | 11/2008 | Chaum ......................... 235/386 |
| 2014/0006685 A1* | 1/2014 | Peterson ............. G06F 12/0238 711/102 |
| 2014/0086406 A1* | 3/2014 | Polzin ...................... G09C 1/00 380/44 |
| 2014/0289536 A1* | 9/2014 | MacCarthy ......... G06F 21/6245 713/189 |
| 2014/0310536 A1* | 10/2014 | Shacham ...................... 713/193 |

* cited by examiner

*Primary Examiner* — Abiy Getachew
(74) *Attorney, Agent, or Firm* — Brinks Gilson & Lione

(57) ABSTRACT

Embodiments for generating and using an enhanced initialization vector are disclosed. In one embodiment, data and a record identifier to which the data is to be written are received. An initialization vector for encrypting the data is then generated. The initialization vector is based on the record identifier and a value that changes every time that the record identifier is to be written to. The value can be generated, for example, by a counter that increments every time the record identifier is to be written to or by a random number generator that generates a random number every time the record identifier is to be written to. In some embodiments, the generated initialization vector is also based on a second value, such as, for example, a value that is shared by other storage modules or a value that is unique to the storage module.

43 Claims, 13 Drawing Sheets

GENERATING AND USING AN ENHANCED INITIALIZATION VECTOR

BACKGROUND

Encryption is often used to protect data at rest, for example, in a memory of, for example, a storage module, a host device, or a server. Encryption techniques, such as block ciphering, break up a large message into small encryption blocks (typically, 128 bits). To ensure two nearly-identical blocks encrypt to different values, each block can be mixed with the encrypted output of the previous block. The first block can use an arbitrary value known as an initialization vector (IV) (or "nonce"). Many encryption techniques use the logical block address (LBA) to which the data is to be written as the seed for the initialization vector. The initialization vector is used in the encryption process as the input of an exclusive-or operation for a first encryption block of data in the process of generating the first cipher block. The encryption process continues with the second encryption block, where the first cipher block is used as the input to the XOR operation instead of the initialization vector. While this technique works well for protecting data at rest on disk-based media, it can create security vulnerabilities when there are multiple copies of the same logical block address on the media.

Overview

Embodiments of the present invention are defined by the claims, and nothing in this section should be taken as a limitation on those claims.

By way of introduction, the below embodiments relate to generating and using an enhanced initialization vector. In one embodiment, data and a record identifier, such as a logical block address to which the data is to be written, are received. An initialization vector for encrypting the data is then generated. The initialization vector is based on the record identifier and a value that changes every time that the record identifier is to be written to. The value can be generated, for example, by a counter that increments every time the record identifier is to be written to or by a random number generator that generates a random number every time the record identifier is to be written to. In some embodiments, the generated initialization vector is also based on a second value, such as, for example, a value that is shared by other storage modules or a value that is unique to the storage module.

Other embodiments are possible, and each of the embodiments can be used alone or together in combination. Accordingly, various embodiments will now be described with reference to the attached drawings.

DETAILED DESCRIPTION OF THE PRESENTLY PREFERRED EMBODIMENTS

Figure 1:
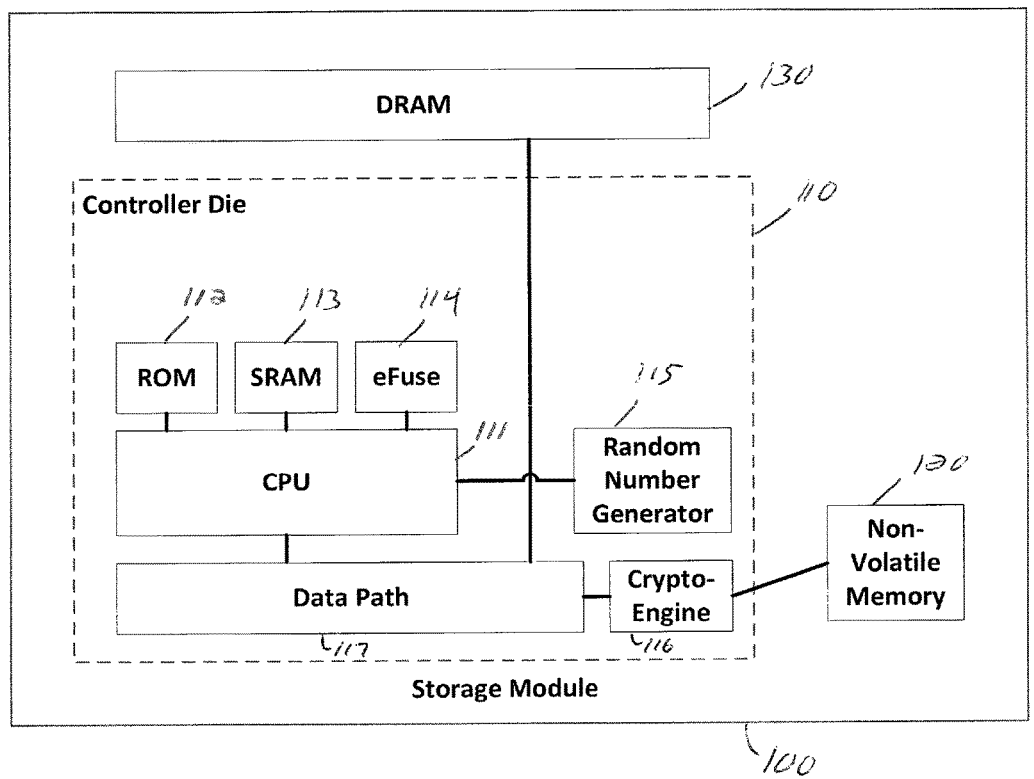
FIG. 1 is a block diagram of an exemplary storage module of an embodiment.

The following embodiments can be used to generate an enhanced initialization vector. As discussed above, an initialization vector is an arbitrary value used in an encryption process as the input of an exclusive-or operation for a first encryption block of data. Many encryption techniques use a record identifier, such as a logical block address (LBA) to which the data is to be written, as the seed for the initialization vector. This method of initialization vector generation is particularly well suited to any application that identifies records with ID's and uses the ID as part of the IV generation. Examples include, but are not limited to, database, servers, storage devices (e.g., hard disk drives (HDD) and solid-state drives (SSD), and caching systems). It is also applicable to scenarios where copies of a record that is normally unique are created, such as, but not limited to, backup, replication, caching, and some types of RAID systems. Storage devices are similar to databases in that they associated records with identifiers. Storage devices typically record information in small units of 512 B or 4 KB. Each block of data is assigned an ID called a logical block address. Some storage devices such as conventional HDDs have minimal translation between LBAs and physical block addresses, so they do not need to store the LBA along with the record. The ID is implicitly known based on the physical location. Other devices such as SSDs have complex mapping schemes and store the LBA in a metadata header associated with the data record. So, it should be noted that while the following embodiments are often discussed in terms of LBA, other forms of record identifiers can be used.

While the above encryption technique works well for protecting data at rest on disk-based media where there is only one copy of the encrypted record, it can create security vulnerabilities when there are multiple copies of the same logical block address on the media. This is because all blocks protected by the same key and initialization vector are vulnerable to attack. The following embodiments overcome this problem by generating an initialization vector based not only on the logical block address, but also on a value that changes every time that logical block address is to be written to. That way, even if there are multiple copies of the same logical block address on the media, each of those copies will be associated with a different initialization vector.

These embodiments can be advantageous for any device that contains memory. that stores (persists) data for some period of time. Such devices can include, but are not limited to, a storage module (e.g., a solid state drive, a hybrid drive, etc.) or a computing module (such as a host device or server), with embedded memory, removable memory, or memory that is otherwise placed in communication with the device. These embodiment find particular advantages when the memory treats data as records, and it is possible for multiple copies of that record to exist. The data can take any form, such as user data email, database records, server backups, RAID applications, and data in a RAM cache in a data center. In general, these embodiment can apply to anything that is record based, where the record is non-volatile (e.g., like user data, a database record, or email).

Before turning to these and other embodiments, the following section provides a discussion of an exemplary storage module and computing device (e.g., host device, server, etc.) that can be used with these embodiments. Of course, these are just examples, and other suitable types of storage modules can be used.

As illustrated in FIG. 1, a storage module 100 of one embodiment comprises a controller 110, non-volatile memory 120, a dynamic random access memory (DRAM) 130. The controller 110 comprises an interface for placing the storage module 100 operatively in communication with a host. As used herein, the phrase "operatively in communication with" could mean directly in communication with or indirectly in communication with through one or more components, which may or may not be shown or described herein.

Figure 2A:
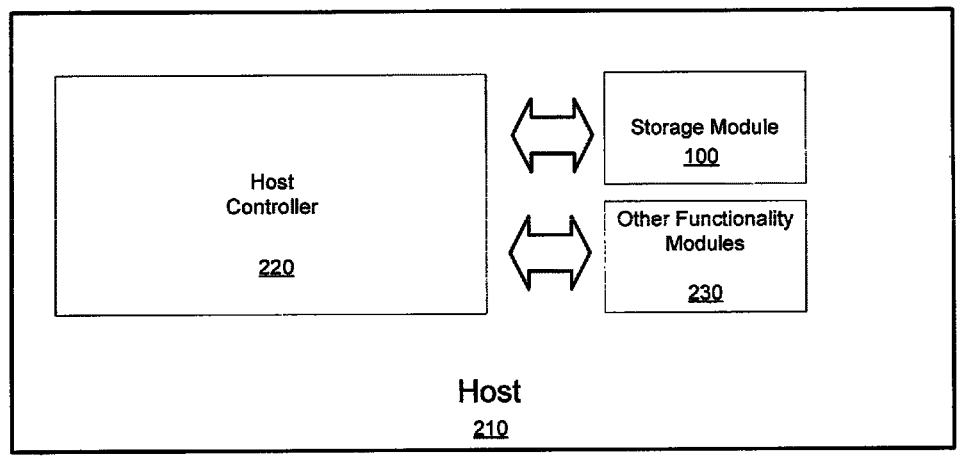
FIG. 2A is a block diagram of a host of an embodiment, where the exemplary storage module of FIG. 1 is embedded in the host.

As shown in FIG. 2A, the storage module 100 can be embedded in a host 210 having a host controller 220. That is, the host 210 embodies the host controller 220 and the storage module 100, such that the host controller 220 interfaces with the embedded storage module 100 to manage its operations. For example, the storage module 100 can take the form of an iNAND™ eSD/eMMC embedded flash drive by SanDisk Corporation. The host controller 220 can interface with the embedded storage module 100 using, for example, an eMMC host interface, a UFS interface, or a SATA, SAS, SCSI, fiber channel, or PCIe interface. The host 210 can take any form, such as, but not limited to, a solid state drive (SSD), a hybrid storage device (having both a hard disk drive and a solid state drive), a memory caching system, a mobile phone, a tablet computer, a digital media player, a game device, a personal digital assistant (PDA), a mobile (e.g., notebook, laptop) personal computer (PC), or a book reader. As shown in FIG. 2A, the host 210 can include optional other functionality modules 230. For example, if the host 210 is a mobile phone, the other functionality modules 230 can include hardware and/or software components to make and place telephone calls. As another example, if the host 210 has network connectivity capabilities, the other functionality modules 230 can include a network interface. Of course, these are just some examples, and other implementations can be used. Also, the host 210 can include other components (e.g., an audio output, input-output ports, etc.) that are not shown in FIG. 2A to simplify the drawing.

Figure 2B:
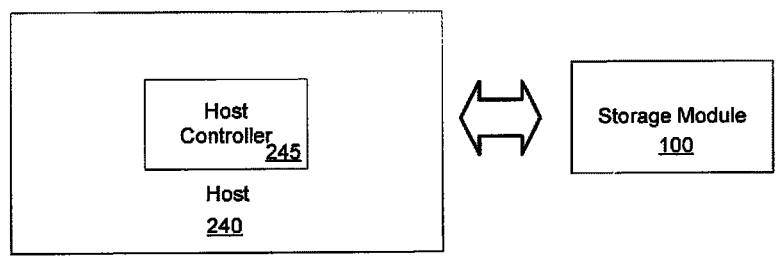
FIG. 2B is a block diagram of the exemplary storage module of FIG. 1 removably connected to a host, where the storage module and host are separable, removable devices.

As shown in FIG. 2B, instead of being an embedded device in a host, the storage module 100 can have physical and electrical connectors that allow the storage module 100 to be removably connected to a host 240 (having a host controller 245) via mating connectors. As such, the storage module 100 is a separate device from (and is not embedded in) the host 240. In this example, the storage module 100 can be a removable memory device, such as a Secure Digital (SD) memory card, a microSD memory card, a Compact Flash (CF) memory card, or a universal serial bus (USB) device (with a USB interface to the host), and the host 240 is a separate device, such as a mobile phone, a tablet computer, a digital media player, a game device, a personal digital assistant (PDA), a mobile (e.g., notebook, laptop) personal computer (PC), or a book reader, for example.

In FIGS. 2A and 2B, the storage module 100 is in communication with a host controller 220 or host 240 via an interface. The interface can take any suitable form, such as, but not limited to, an eMMC host interface, a UFS interface, and a USB interface. The interface in the storage module 110 conveys memory management commands from the host controller 220 (FIG. 2A) or host 240 (FIG. 2B) to the controller 110, and also conveys memory responses from the controller 110 to the host controller 220 (FIG. 2A) or host 240 (FIG. 2B). Also, it should be noted that when the storage module 110 is embedded in the host 210, some or all of the functions described herein as being performed by the controller 110 in the storage module 100 can instead be performed by the host controller 220.

Figure 2C:
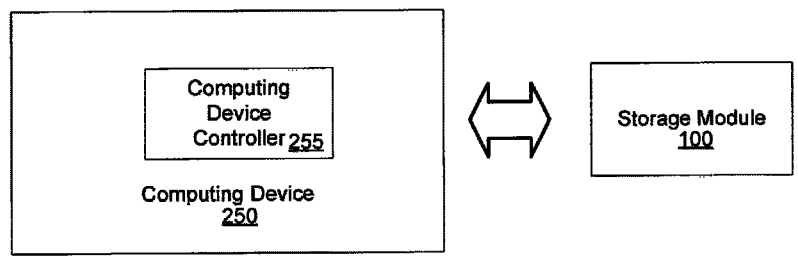
FIG. 2C is a block diagram of a computing device of an embodiment.

As mentioned above, these embodiments can be performed on a computing device 250 (having a controller 255) instead of in a storage module (see FIG. 2C). The computing device can be, for example, a host device or a server, with embedded memory, removable memory, or memory that is otherwise placed in communication with the device (e.g., a hard drive connected to a computer via a cable). The computing device controller 255 can generate the initialization vector and can also be responsible for running the general operation of the computing device 250, such as running the operating system and performing other functions.

Returning to FIG. 1, the controller 110 comprises a central processing unit (CPU) 111, a read only memory (ROM) 112 (which can store boot code, boot data/parameters, tables, etc.), static random access memory (SRAM) 113, an eFuse 114 (i.e., a one-time programmable memory, which can store a master key, as discussed below), a random number generator 115, a hardware crypto-engine 116 (such as an Advanced Encryption Standard (AES) engine), and a data path 117. The non-volatile memory 120, which can be a NAND or other type of memory, can used as a mass storage device to store host/user data, host keys, storage module keys, storage module tables, and storage module firmware. Of course, the controller 110 can use different or other components, and not all components shown here may be needed in every embodiment (e.g., the random number generator may not be used unless there is a need for the generation of a random number, such as for generating a random security counter, as will be discussed below).

The controller 110 can be implemented in any suitable manner. For example, the controller 110 can take the form of a microprocessor or processor and a computer-readable medium that stores computer-readable program code (e.g., software or firmware) executable by the (micro)processor, logic gates, switches, an application specific integrated circuit (ASIC), a programmable logic controller, and an embedded microcontroller, for example. Suitable controllers can be obtained from Marvell or SandForce.

The non-volatile memory 120 can also take any suitable form. For example, in one embodiment, the non-volatile memory 120 takes the form of a solid-state (e.g., flash) memory and can be one-time programmable, few-time programmable, or many-time programmable. The non-volatile memory 120 can also use single-level cell (SLC), multiple-level cell (MLC), triple-level cell (TLC), or other memory technologies, now known or later developed.

With exemplary configurations of the storage module 100 now described, the following section discusses methods for generating an enhanced initialization vector.

Figure 3:
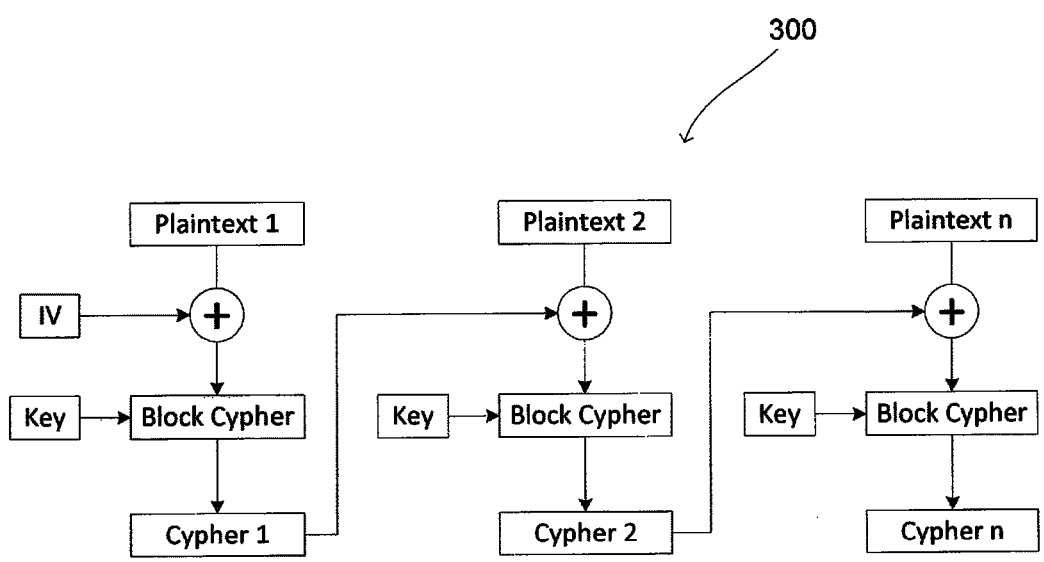
FIG. 3 is a diagram of a block cipher process used in an embodiment.

As mentioned above, encryption is often used to protect data at rest in the memory of the storage module, where the threat model assumes the attacker can extract the raw encrypted data from the media. Encryption techniques, such as block ciphering, break up a large message into small encryption blocks (typically, 128 bits). To ensure two nearly-identical blocks encrypt to different values, each block can be mixed with the encrypted output of the previous block. The first block can use an arbitrary value known as an initialization vector (IV) (or "nonce"). Though perhaps counter-intuitive, the initialization vector does not have to be a secret and can even be stored with the encrypted data. This is because the initialization vector of any given block after the first block is the encrypted value of the previous block, which is already stored in the memory. The following notation and the diagram in FIG. 3 show how a typical block cipher works, with the symbol of the "plus" sign with the circle around it meaning exclusive-or (XOR):

$C_1 = Cypher_k(P_1 \oplus IV)$
$C_j = Cypher_k(P_j \oplus Cz_{j-1})$ for $j=2 \ldots n$ In short, the initialization vector is exclusive-or'ed (XOR'ed) with the plain text message of the first block, then encrypted with the key to produce the cipher block. The cipher block output is then used as the initialization vector for the next message. Of course, this is merely one example of an encryption technique, and other techniques are possible.

Many encryption techniques use the logical block address (LBA) to which the data is to be written as the seed for the initialization vector. While this technique works well for protecting data at rest on disk-based media, it can create security vulnerabilities for storage modules, such as NAND-based media, where there can be multiple copies of the same logical block address on the media. This is because all blocks protected by the same key and initialization vector are vulnerable to attack. More specifically, if an initialization vector is repeated, the cipher can leak information even though the key is still a secret (i.e., not guessed or broken). This happens because any two identical plain-text input blocks that are encrypted with the same key and the same initialization vector will produce the same output. This will continue until the first difference in the input blocks. One type of attack that uses this property is called a "known plain text" attack.

Figure 4:
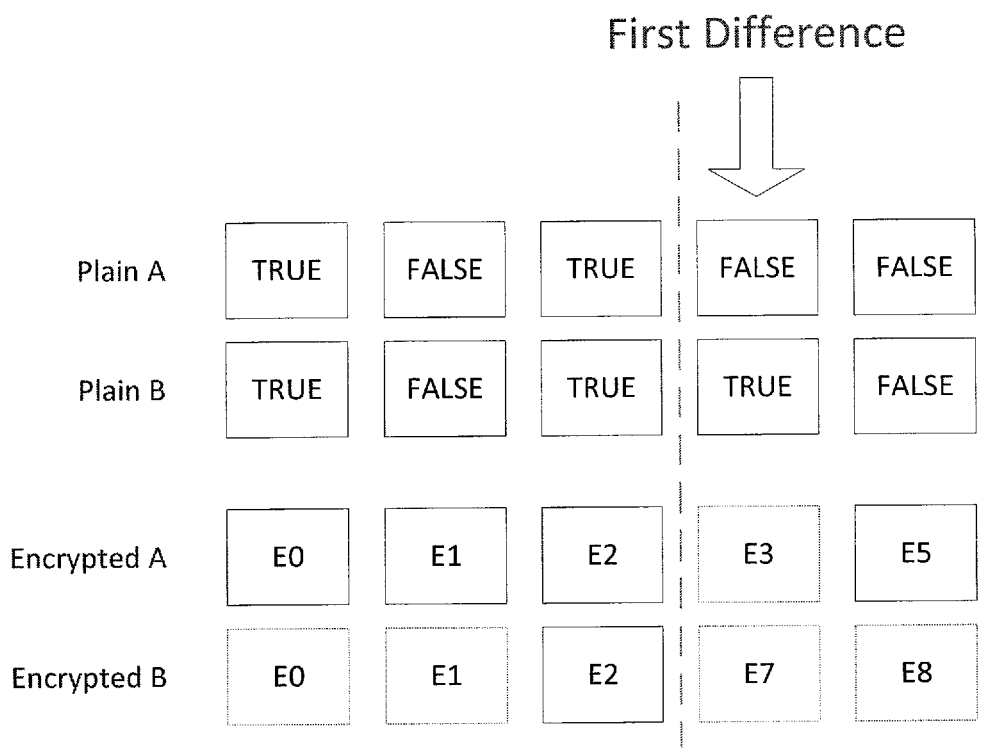
FIG. 4 is an illustration of a known-plain-text-attack problem that can be overcome with these embodiments.

With reference to FIG. 4, consider a simple example where an initialization vector is reused on similar data records. Each field has only two values: true or false. Two people fill out a simple health questionnaire. Most people answer the first four questions the same way. In the example shown in FIG. 4, person B answers the fourth question differently. That question is very personal and embarrassing to person B. From the encrypted output, the attacker knows question four has a different answer. If the number of possible values is small (such as true or false), the attacker can guess the plain text value. Also, in some cases, a talented extortionist can use the simple knowledge of a difference to suggest they know more than they do. This can put pressure on person B to comply with an unethical request from the attacker.

This "known plain text" situation can occur when there are multiple copies of the same logical block address in the memory. This often occurs with NAND memory devices because of the way the memory is managed. For example, with NAND memory, the erase unit is often bigger than the write unit. This means that a storage device will try to delay erasing a block until most of the data in the block has become obsolete. Though the copies are marked as obsolete, they are still present on the media until the block is erased, and, often, the data for a given LBA changes only slightly. Thus, all blocks protected by the same key and initialization vector are vulnerable to different attacks including variations of "known plain text" attacks. This problem can also occur in non-NAND-based memory. For example, in shingled magnetic recording, the hard disk drive overlaps track N and N+1 in order to achieve higher storage density. The result of this is that it is not possible to overwrite a physical location without first moving out the data that is still valid. So, like NAND storage, there will be multiple copies of the same logical block address in the memory, which are vulnerable to a "known plain text" attack.

The following embodiments of generating and using an enhanced initialization vector provide for stronger protection. These embodiments work well for all storage media types but is particularly useful for NAND storage and other technologies where there are multiple copies of the same logical block address in the memory. This method can be implemented wherever data is encrypted, be it on the storage module or on the host. However, for simplicity, the following embodiments will discuss the situation in which the storage module performs the method.

In general, the storage module 100 receives data and a logical block address to which the data is to be written. The storage module then generates an initialization vector for encrypting the data. In this embodiment, the initialization vector is based on the logical block address and a value that changes every time that logical block address is to be written to. Because the value changes every time the logical block address is to be written to, the initialization vector will be unlikely be duplicated for a very long time. So, in situations where there are multiple copies of a logical block address stored in the memory 120 (e.g., when there are copies marked "obsolete" prior to a block erase), those multiple copies will be much less susceptible to a "known plain text" attack because each of the copies will have its own initialization vector (due to the use of the changing value).

Figure 5:
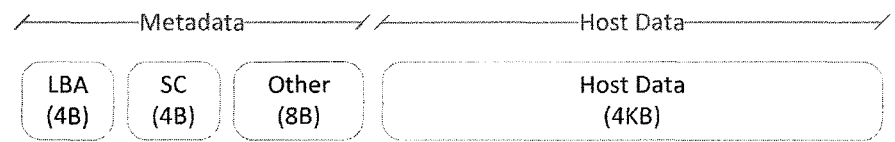
FIG. 5 is a diagram of an initialization vector of an embodiment stored as metadata for host data.

As shown in FIG. 5, in one embodiment, the initialization vector is stored as metadata, along with host data, in the memory 120. This way, when decrypting the host data, the hardware crypto-engine 116 can read the LBA and the value (sometimes referred to herein as the "security counter" or "SC") from the metadata to automatically set up the initialization vector before beginning the decryption of the host data. In one embodiment, the value is four bytes, and the 32-bit combination of LBA and SC can be unique for 4.2 billion writes of any given LBA. On a device with a 4K sector, this can represent 16 TB worth of write traffic to a specific LBA. The LBA and the value in the header are constant until the data is overwritten (i.e., a new write to that LBA). In other words, the LBA and the value are preserved when an existing valid sector is moved to a new physical location. This means that there is no need to decrypt the host data on relocation, which improves performance and helps when the device does not have access to the encryption key.

The changing value that is the basis of the initialization vector can take any suitable form. For example, in one embodiment, the value is generated by a counter that increments every time the logical block address is to be written to or a global counter can be used. The counter can be part of the CPU 111 or can be a separate component outside of the CPU 111 (or controller 110). While there are 32 bits to the counter in the embodiment shown in FIG. 5, more bits can be added to push the counter rollover further out if desired. Instead of using a sequential counter, the random number generator 115 can be used to generate a random number every time the logical block address is to be written to. Of course, other methods for generating the value are possible. For simplicity, the value is sometimes referred to herein as the "security counter" (SC). However, while "security counter" can refer to a value from a counter, as noted above, the value can instead by a random number from the random number generator 115 or a number otherwise generated for used in generating the initialization vector according to these embodiments.

Figure 6:
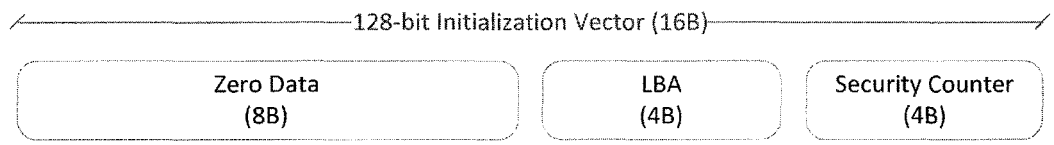
FIG. 6 is a diagram of an initialization vector of an embodiment, where zero data is added to the initialization vector.
Figure 7:
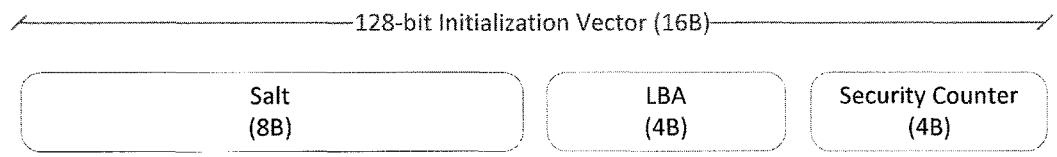
FIG. 7 is a diagram of an initialization vector of an embodiment, where cryptographic salt is added to the initialization vector.

There are several alternatives that can be used with these embodiments. For example, as indicated in FIG. 5, the initialization vector may include "other" data, such as when the initialization vector is defined to be 16 bytes, the LBA and value occupy four bytes each, and other data is needed to fill the space. In such a situation, the other data can simply by zero data (or another value that is constant among a set of storage modules) in order to fill the remaining space, as shown in FIG. 6. In another embodiment, instead of being filled with constant (e.g., zero) data that is shared among a set of storage modules, the extra space is filled with a number (e.g., a random number) that is unique to the storage module. This additional value can be generated using different techniques, such as but not limited to, fixed, random, or algorithmic techniques (with fixed or random inputs), or any combination thereof. This number can be, for example, a device random number generally known as a "cryptographic salt" (see FIG. 7). One option is to generate the salt and the system key during production time and store both on the storage module 100. For example, the salt can be stored in the eFuse 114 along with the system key or encrypted with the system key and stored in the memory 120. It is also possible to scale up this approach to use a unique salt for each key used to encrypt the media 120. The key and salt are preferably updated together. It should be noted that a small set of global salt can be used to make it easier to track; otherwise, it may need to be stored in the header. This is a tradeoff between security and cost. 64-bits can be stored in the header, and the other 64 bits can be driven from a known value. One option is zero-data, another is a fixed global pattern, another is a small set of global patterns that are derived from the LBA (i.e., LBA Range A-B, use pattern 1) (other ways of assigning LBA to salt are possible).

Figure 8:
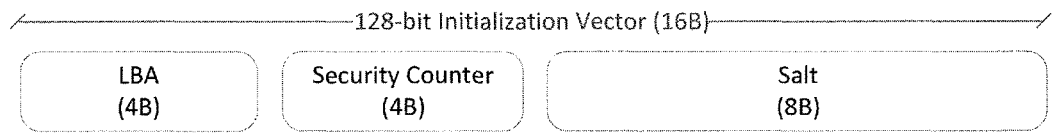
FIG. 8 is a diagram of an initialization vector of an embodiment, where the cryptographic salt is positioned in the lower-order bits of the initialization vector.

Though most block ciphers work as previously described, the counter (CTR) block cipher mode uses the initialization vector like a very large counter. In this mode, the base initialization vector is incremented by one after each 128-bit encryption block (a 4K LBA has 256 128-bit encryption blocks). If the method described above were used in the CTR block cipher mode, two base counters will overlap for 255 out of 256 128-bit encryption blocks. One possibility to address this is to increment the security counter by 256 instead of 1, but this will lead to significantly faster roll-over of the counter. By swapping the position of the elements, all of the previously-described characteristics can be preserved. That is, as shown in FIG. 8, by moving the security counter to the high order bits, the changes to the lower bits required by CTR mode are applied to the low-order bits of the salt (i.e., the salt (or additional value) would be located in the least significant digits of the initialization vector). In this way, modifying the salt will have no impact on security or how long it takes the security counter to roll-over. Almost any combination of bit-mixing can be used. For example, 16-bits from the salt can be put it in the lower-order bit position, then 16-bits from the LBA can be put in the next position, and then the 16-bits from the security counter in the next position, etc. The method for mixing can be consistent, or the bits can be mixed based on some other input (e.g., the LBA can dictate the mixing order). That is, the positions of the bits of the logical block address, value, and additional value in the initialization vector can be mixed based on a constant formula or variable input.

It should be noted that while the paragraphs above discussed generating the initialization vector, other embodiments can use the generated initialization vector. While the device that generated the initialization vector can be the same device that uses the initialization vector, in other embodiments, the device that generates the initialization vector can be different from the device that uses the initialization vector. For example, in one embodiment, a host device can generate the initialization vector and provide it to a storage module for use, or vice versa.

Returning to the drawings, FIGS. 9-16 are flow diagrams (in unified modeling language) of specific implementations of the embodiments described above. It should be noted that these are merely examples, and the details discussed below should not be read into the claims unless expressly recited therein.

Figure 9:
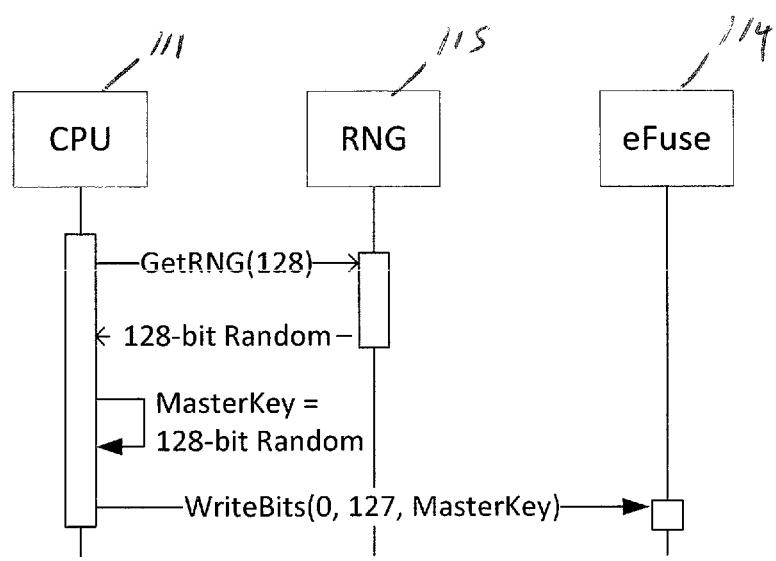
FIG. 9 is a flow diagram of a method of an embodiment for generating a master key.

FIG. 9 is a flow diagram of a method of an embodiment for generating a master key for use in encryption. The CPU 111 interacts with the random number generator 115 to ask for 128 bits, which the random number generator 115 returns to the CPU 111. The CPU 111 then assigns the value to a variable called MasterKey and then stores the MasterKey in the eFuse 114, which is a one-time programmable memory. So, the MasterKey is simply a random number that is kept secret within the controller 110 in the eFuse 114. In some implementations, multiple eFuse banks are used to allow the device to store a small number of new values. Old values in an eFuse can be overwritten by overwriting the data to all 1's.

Figure 10:
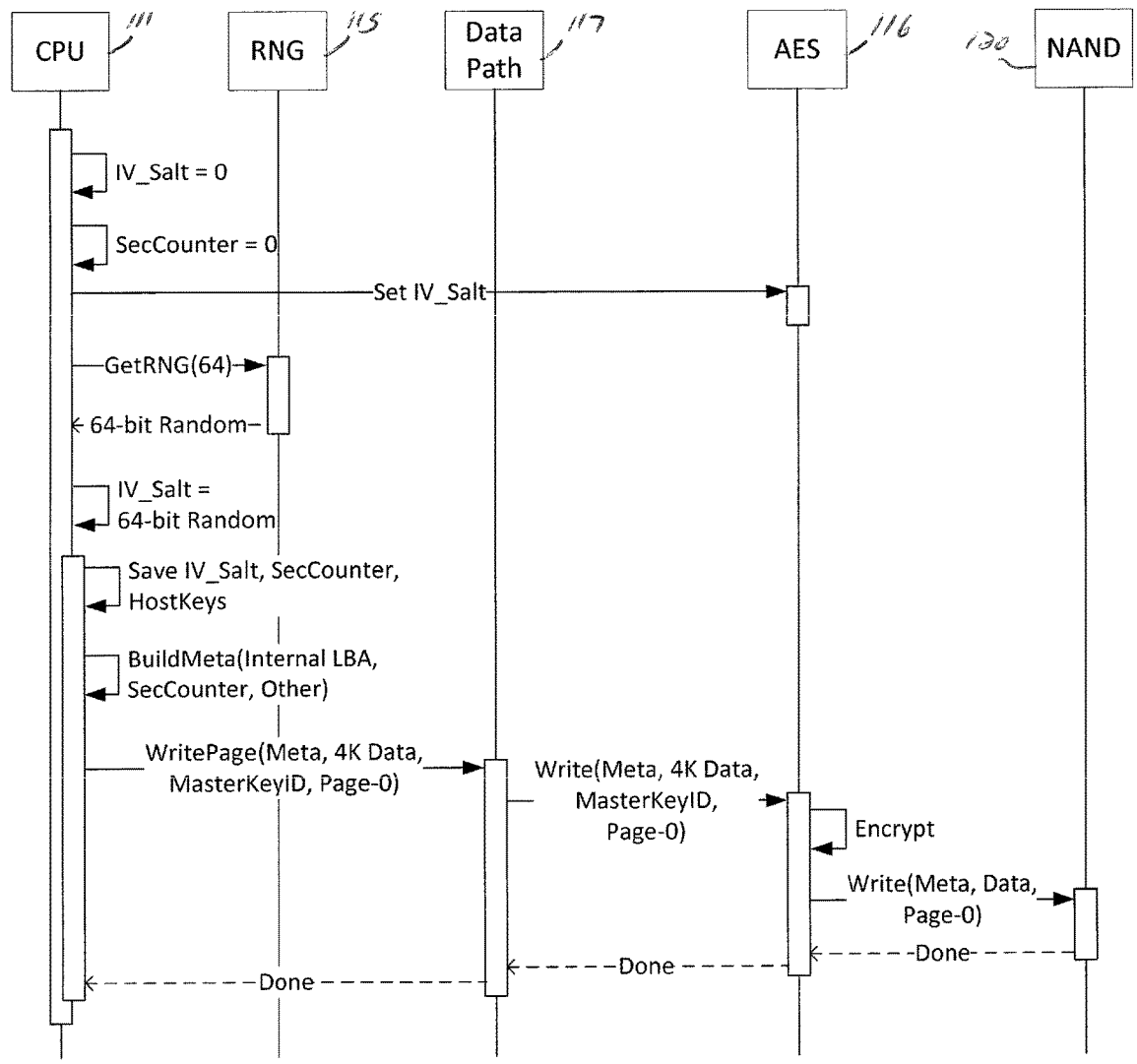
FIG. 10 is a flow diagram of a method of an embodiment for generating parameters.

FIG. 10 is a flow diagram of a method of an embodiment for generating parameters. Here, variable parameters, such the IV_Salt and the SecCounter, are stored in the memory 120 rather than the eFuse 114. As such, these parameters are stored in encrypted form. The master key is stored in the eFuse 114, so the secure parameters can be encrypted with the master key. The IV_Seed can either be all 0's or a master IV_Seed can be stored in the eFuse 114. The master parameters are used to retrieve the user parameters, which are encrypted and stored in the memory 120. The SecCounter that is used for the user block can be any value if there is only ever to be one copy of this block by design. Zero is a reasonable value, while another option is to use a random number. The host keys can be generated by storage module 100 or supplied by host 50. They can be encrypted using the Master Key and stored in the memory 120. The special boot block, security counter, and initialization vector can be zero. In one alternate embodiment, the Master IV_Salt is stored in eFuse 114, and a security counter is used for each record type.

Figure 11:
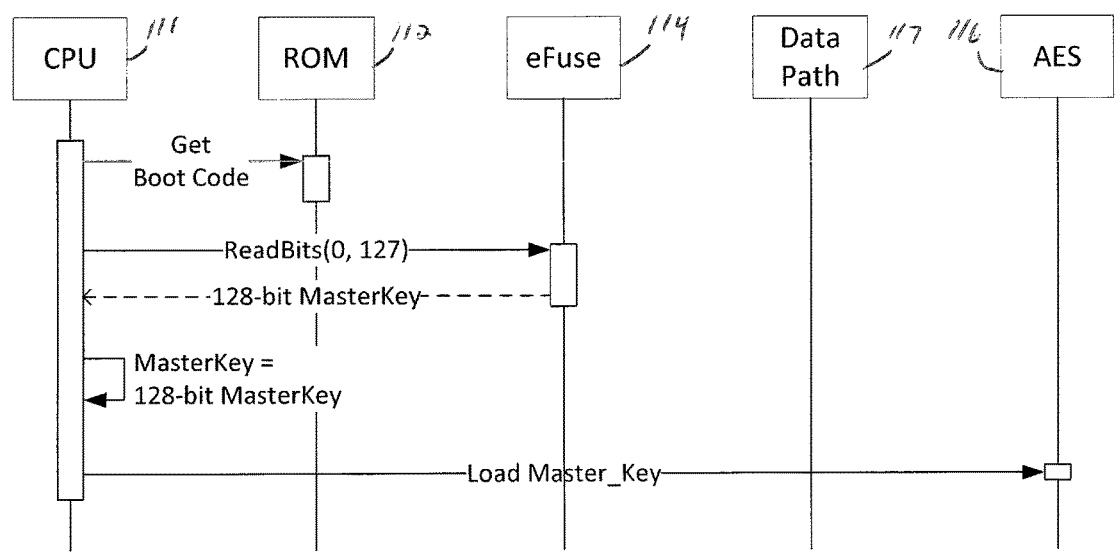
FIG. 11 is a flow diagram of a method of an embodiment for loading a master key.

FIG. 11 is a flow diagram of a method of an embodiment for loading a master key. This diagram shows the boot sequence after the security parameters have been generated and stored. The CPU 11 reads the ROM code and fetches the master key from the eFuse 114. It then configures the crypo-engine 116 (here, an AES engine) with the master key. In some implementation, the AES engine 116 stores all the keys within an internal RAM. It can also put the keys in SRAM. Either approach is crypto safe (assuming the device locks down external access ports, debug ports, and diagnostic commands).

FIG. 11 is a flow diagram of a method of an embodiment for loading parameters. Once the master key is loaded, the CPU 11 can grab the user security parameters from the memory 120. First, the CPU 111 reads the page. The SecCounter is stored in the Metadata, and the IV_Seed (i.e., the salt that was previously described) is encrypted in the memory 120. The CPU 11 can either set the IV_Seed to 0 for this block or use a master seed, which can be stored in the eFuse 114. Once the data is decrypted and returned to the CPU 111, the CPU 111 extracts the IV_Seed and HostKeys and reconfigures the AES 116 for normal operations. Preferably, the SecCounter does not repeat, so it is preferred not to start at zero again. The counter with the key and IV_Seed can be stored, but this number has to be updated frequently. So, it may be preferred to use the properties of a media manager to scan for the last-written block and copy the SecCounter value from the metadata. If random numbers are used, there is no need to scan, as the value can be generated as needed.

Figure 12:
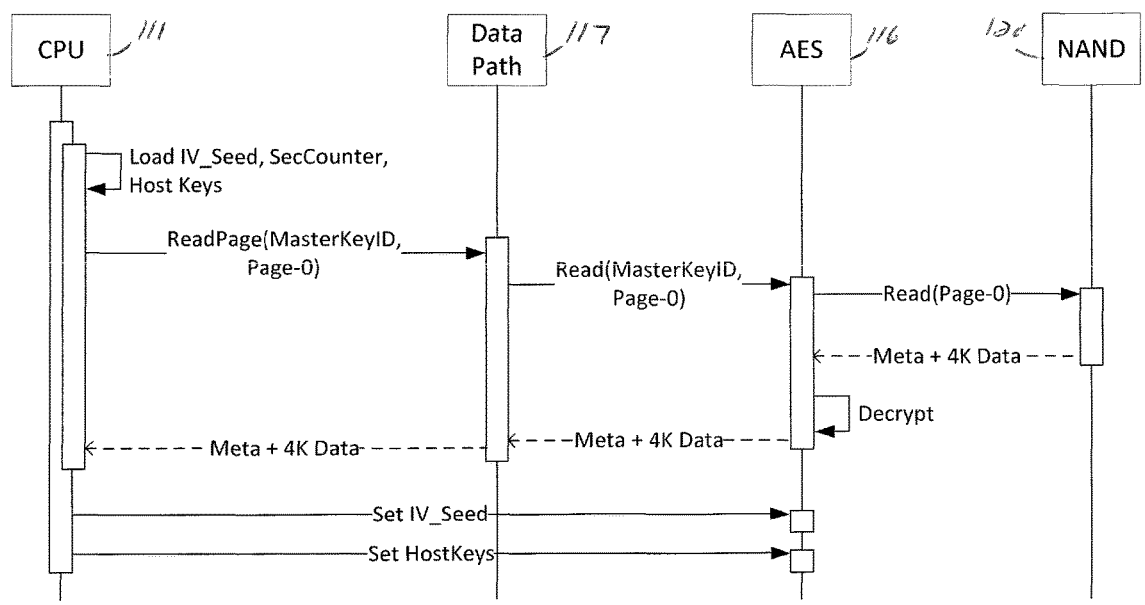
FIG. 12 is a flow diagram of a method of an embodiment for loading parameters.

FIG. 12 is a flow diagram of a method of an embodiment for writing a logical block address. When writing a host page, the CPU 111 updates the SecCounter, maps the LBA to the physical page, and builds the metadata header. The CPU 111 then pushes the metadata down to the data path 117 and also supplies the host key (or user key) ID that is to be used. The actual key is stored in the AES engine. Note that only the data is encrypted, not the metadata, as it does not provide any additional useful information to a potential attacker for a well-designed encryption system (it could provide useful information if the system stored the key in the header).

Figure 13:
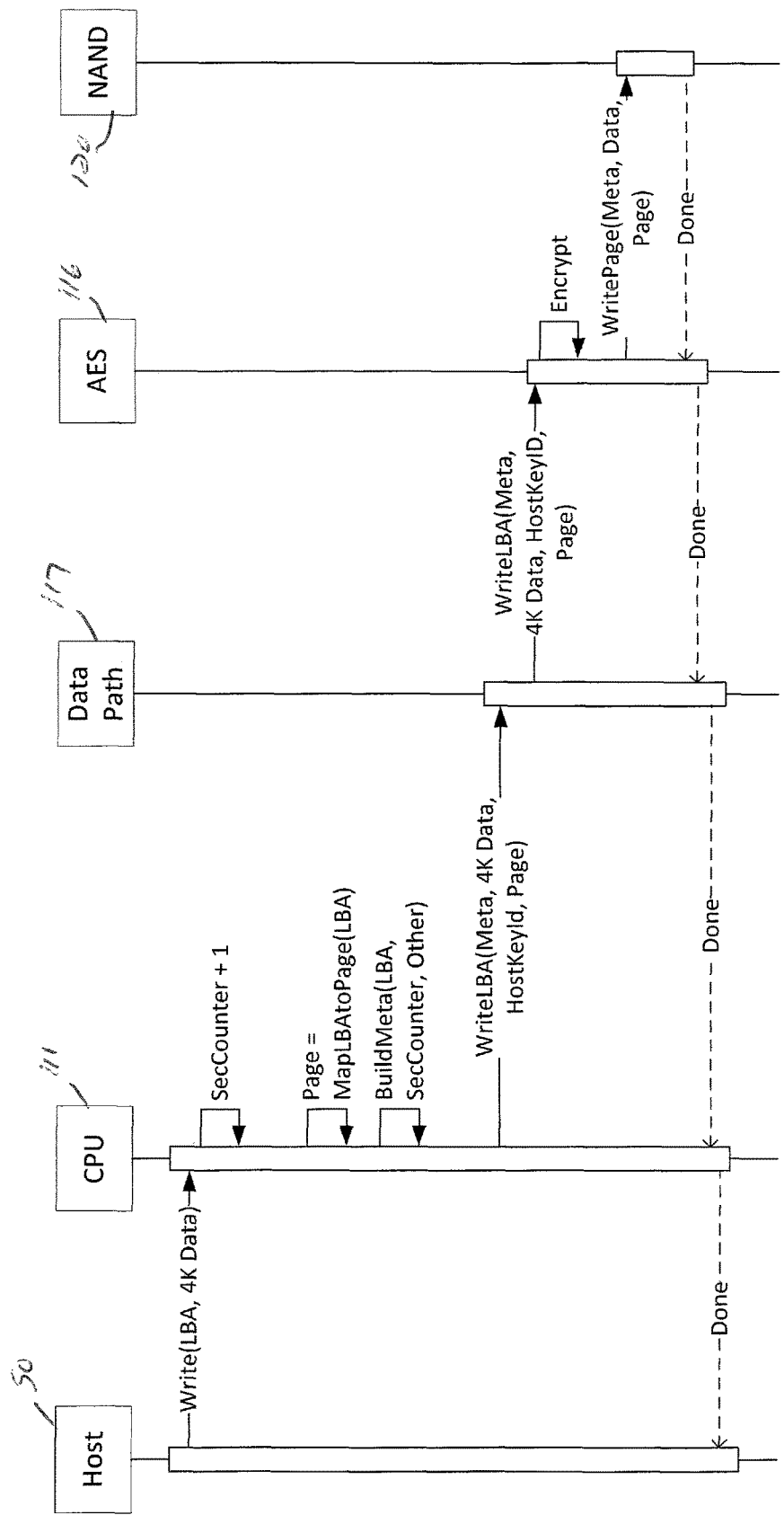
FIG. 13 is a flow diagram of a method of an embodiment for writing a logical block address.
Figure 14:
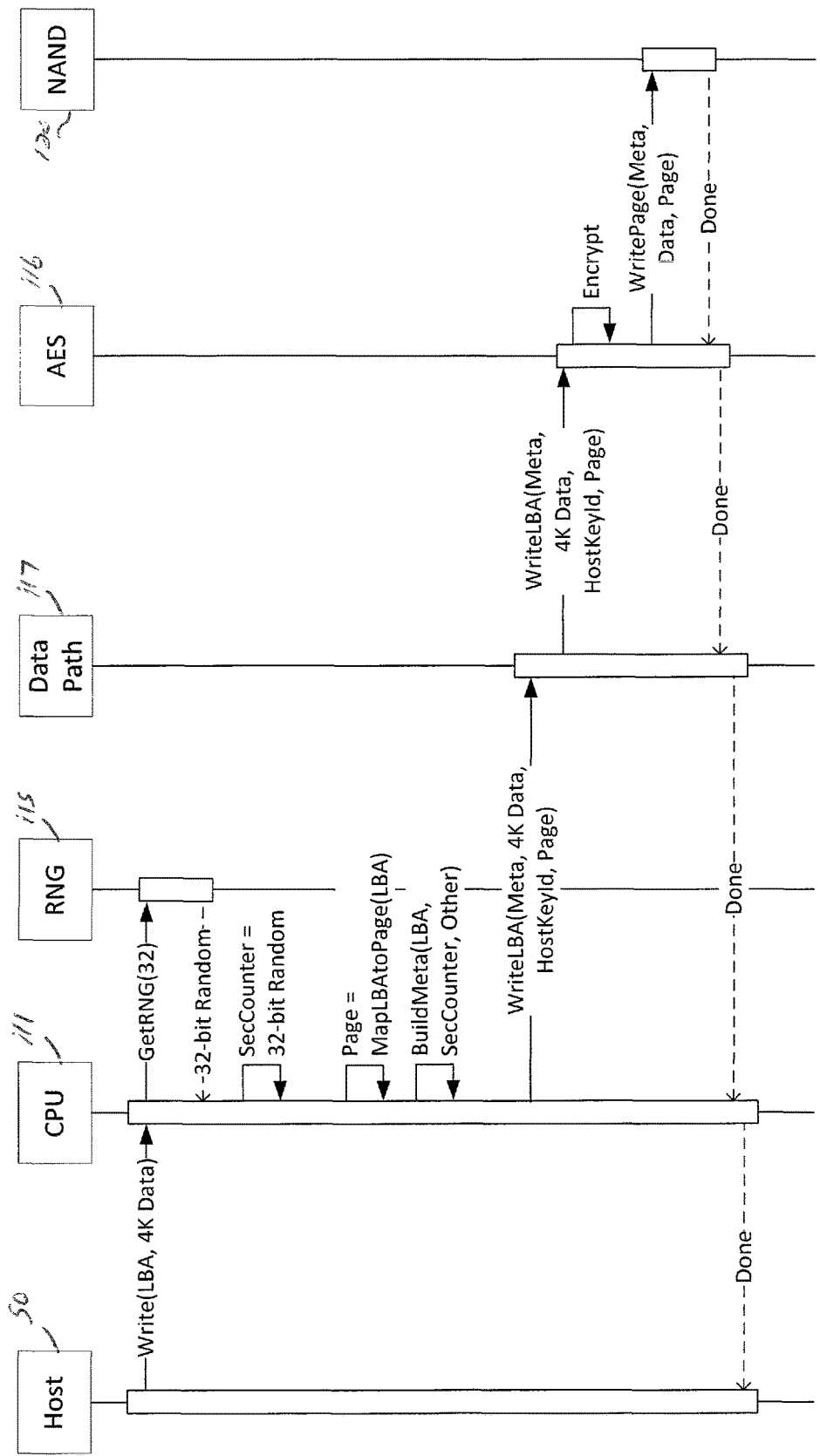
FIG. 14 is a flow diagram of a method of an embodiment that uses a random number generator.
Figure 15:
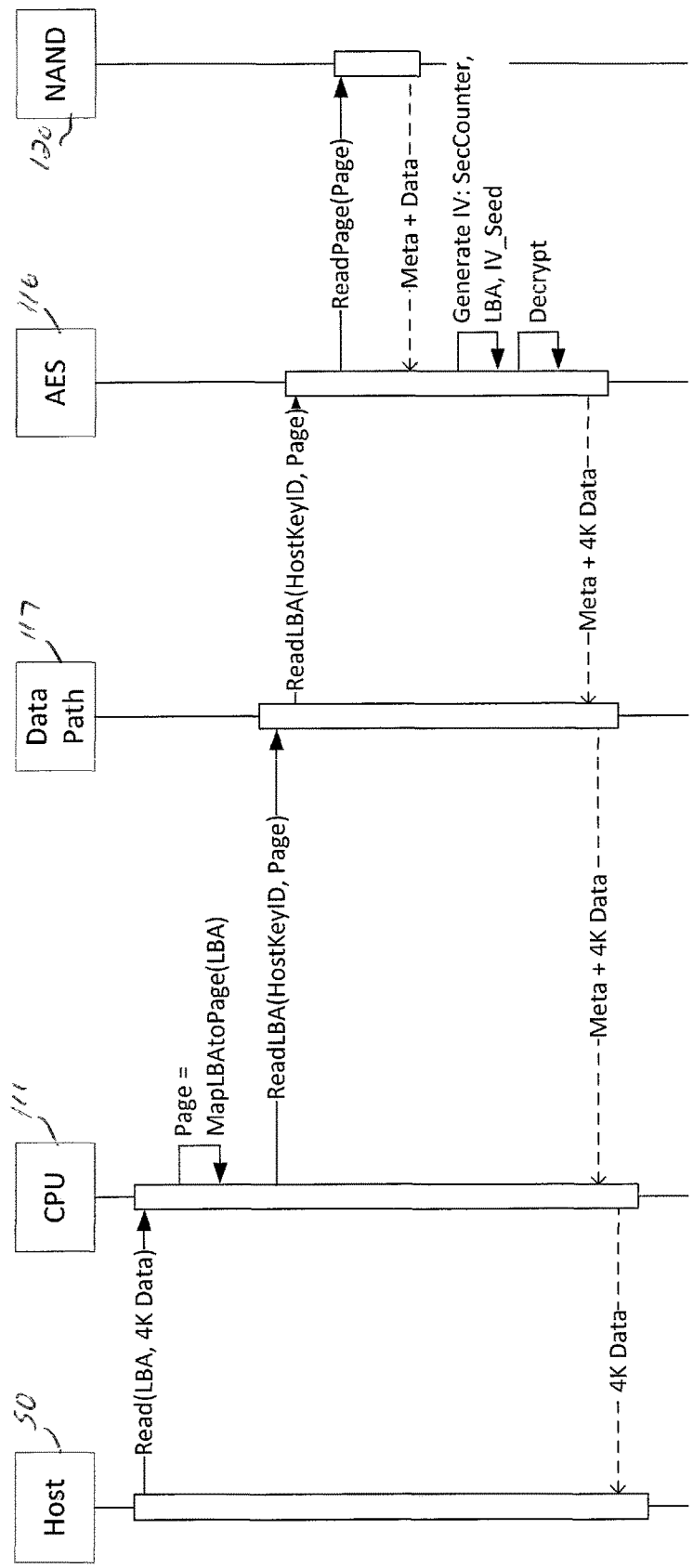
FIG. 15 is a flow diagram of a method of an embodiment for reading a logical block address.
Figure 16:
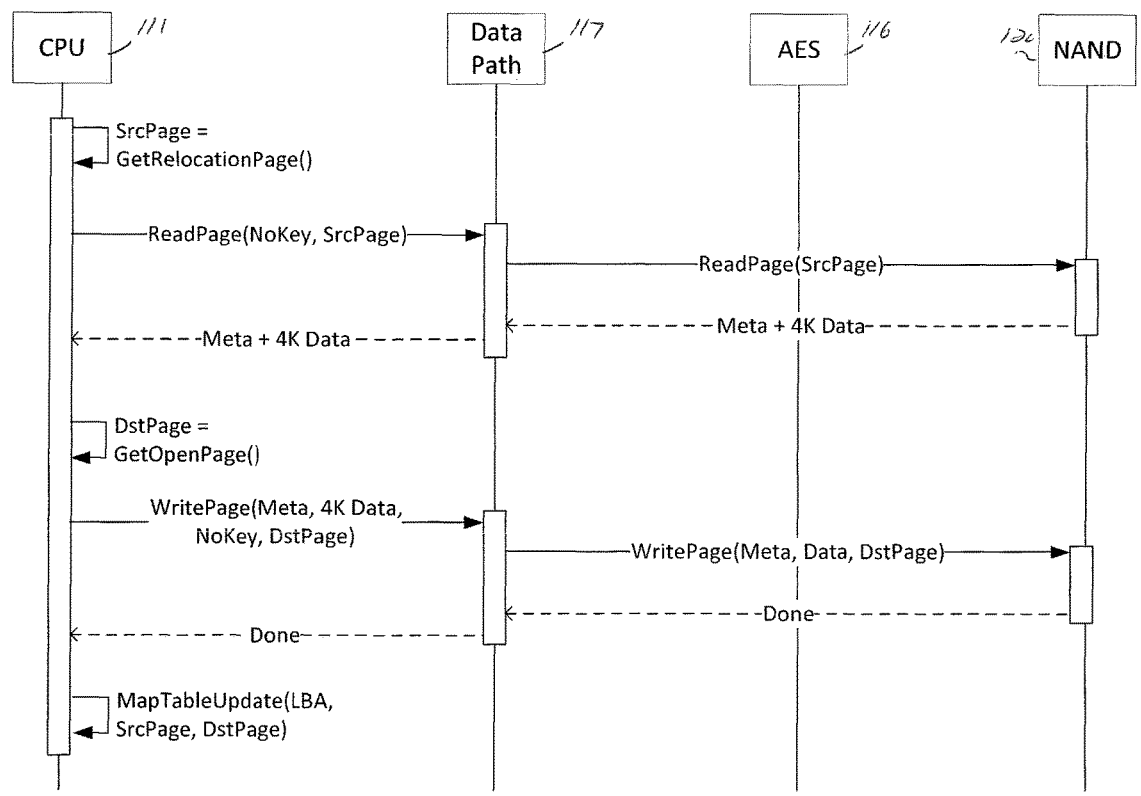
FIG. 16 is a flow diagram of a method of an embodiment for relocating a logical block address.

FIG. 13 is a flow diagram of a method of an embodiment that uses a random number generator. Instead of having to track a counter, one could argue that using a random number for the SecCounter is more efficient. The odds of collision are very small and roughly equivalent to sequential counters for this application (storage devices). SecCounter can also be generated randomly instead of sequentially (the chances of collision are small), which results in one fewer parameter to store and manage. FIG. 14 is a flow diagram of a method of an embodiment for reading a logical block address. It should be noted that it does not matter how SecCounter was generated or stored in the metadata. FIG. 15 is a flow diagram of a method of an embodiment for relocating a logical block address. In this embodiment, when relocating data, the metadata is not modified, and the 4K Data is not decrypted. In an alternate embodiment, the data is decrypted on relocation.

It should be understood that the length of various fields discussed herein are just examples and other lengths can be used. For example, one or more of the record identifier (e.g., LBA), SecCounter, and IV_Seed fields to build the IV can be of any size, though a typical mix is 32 b, 32 b, 64 b. Also, as noted above, any method can be used to mix these three values, and the SecCounter can be a value from a counter, a random value, or a value that is algorithmically derived value based on a counter. Regardless of how the SecCounter field is generated, it can be stored with the ID, either directly in the metadata or in a separate table indexed by the ID. The IV_Seed can be generated by any combination of fixed value or random techniques. There can be one IV_Seed or a set of seeds that is selected algorithmically (i.e., LBA A-B→Seed 1). The IV_Seed can be generated algorithmically, so the IV_Seed can change with every LBA. It can be a formula that takes ID and SecCount and mixes/hashes the bits, where the hashing function can be SHA-128, for example. If a hashing function is used, other data can be mixed into the IV_Seed, such as the previously-mentioned fixed or random value that is selected algorithmically.

There are several advantages associated with these embodiments. First, these embodiments provide a strong initialization vector that is unique for the life of the key and is difficult to guess. By generating an initialization vector not only on the logical block address, but also on a value that changes every time that logical block address is to be written to, even if there are multiple copies of the same logical block address on the media, each of those copies will be associated with a different initialization vector. This protects against the known-plain-text-attack problem, which is a vulnerability in systems that use the logical block address alone as the seed for the initialization vector. Plus, this added protection does not have a performance impact on encryption or decryption, and it works well with all types of storage technologies. Further, these embodiments avoid the overhead of other possible solutions, such as encrypting the initialization vector (which would add additional encryption overhead on each host sector) or generating a 128-bit (16 byte) random number for each 4K LBA (which would impact performance, RAM, and storage efficiency, as well as require a 64 MB of table storage on a 16 GB device).

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

What is claimed is:

1. A method for generating an initialization vector for encryption, the method comprising:
performing the following in a processor, wherein the processor includes hardware component:
obtaining data and a logical block address to which the data is to be written;
generating an initialization vector for encrypting the data, wherein the generated initialization vector is based on the logical block address and a value that changes every time that the logical block address is to be written to, wherein the initialization vector is different every time the logical block address is written to because the initialization vector is based on the value that changes every time that the logical block address is written to;
encrypting the data at least in part by using the initialization vector; and storing the encrypted data in a memory, wherein the memory stores at least one previously-stored version of the data marked as obsolete, wherein the encrypted data and the at least one previously-stored version are each associated with the same logical block address but with different initialization vectors, and wherein the different initialization vectors protect against a known plain text attack by preventing differences from being identified between the encrypted data and the at least one previously-stored version.

2. The method of claim 1, wherein the value is generated by a counter that increments every time the logical block address is to be written to.

3. The method of claim 1, wherein the value is generated by a random number generator that generates a random number every time the logical block address is to be written to.

4. The method of claim 1, wherein the initialization vector is based also on a cryptographic salt, wherein the value is positioned in high order bits of the initialization vector, and wherein the cryptographic salt is positioned in low order bits of the initialization vector.

5. The method of claim 4, wherein the cryptographic salt is shared by a plurality of storage modules.

6. The method of claim 4, wherein the cryptographic salt is unique to a storage module that generates the initialization vector.

7. The method of claim 1, wherein the initialization vector and value are stored as metadata for the data.

8. The method of claim 1, wherein the processor is in a storage module that comprises the memory.

9. The method of claim 8, wherein the storage module is embedded in a host.

10. The method of claim 8, wherein the storage module is removably connected to a host.

11. The method of claim 8, wherein the storage module is a solid-state drive.

12. The method of claim 1, wherein the memory is a NAND memory.

13. The method of claim 1, wherein the processor is in a host in communication with a storage module.

14. The method of claim 1, wherein the processor is in a server.

15. A method for using an initialization vector for encryption, the method comprising:
performing the following in a processor in a storage module that comprises a memory, wherein the processor includes a hardware component:
obtaining an initialization vector for encrypting data, wherein the initialization vector is based on a logical block address to which the data is to be written and a value that changes every time that the logical block address is to be written to, wherein the initialization vector is different every time the logical block address is written to because the initialization vector is based on the value that changes every time that the logical block address is written to;
encrypting the data at least in part by using the initialization vector; and storing the encrypted data in the memory, wherein the memory stores at least one previously-stored version of the data marked as obsolete, wherein the encrypted data and the at least one previously-stored version are each associated with the same logical block address but with different initialization vectors, and wherein the different initialization vectors protect against a known plain text attack by preventing differences from being identified between the encrypted data and the at least one previously-stored version.

16. The method of claim 15, wherein the value is generated by a counter that increments every time the logical block address is to be written to.

17. The method of claim 15, wherein the value is generated by a random number generator that generates a random number every time the logical block address is to be written to.

18. The method of claim 15, wherein the initialization vector and value are stored as metadata for the data.

19. The method of claim 15, wherein the storage module is embedded in a host.

20. The method of claim 15, wherein the storage module is removably connected to a host.

21. The method of claim 15, wherein the memory is a NAND memory.

22. The method of claim 15, wherein the storage module is a solid-state drive.

23. The method of claim 15, wherein the initialization vector is based also on a device random number, wherein the device random number is generated during production time of the storage module and stored in the storage module, and wherein the value is positioned in higher-ordered bits than the device random number.

24. A storage module comprising:
a memory; and
one or more controllers that each include a hardware component, wherein the one or more controllers are configured to:
obtain data and a logical block address to which the data is to be written;
generate an initialization vector for encrypting the data, wherein the generated initialization vector is based on the logical block address and a value that changes every time that the logical block address is to be written to, wherein the initialization vector is different every time the logical block address is written to because the initialization vector is based on the value that changes every time that the logical block address is written to;
encrypt the data at least in part by using the initialization vector; and store the encrypted data in the memory, wherein the memory stores at least one previously-stored version of the data marked as obsolete, wherein the encrypted data and the at least one previously-stored version are each associated with the same logical block address but with different initialization vectors, and wherein the different initialization vectors protect against a known plain text attack by preventing differences from being identified between the encrypted data and the at least one previously-stored version.

25. The storage module of claim 24, wherein the value is generated by a counter that increments every time the logical block address is to be written to.

26. The storage module of claim 24, wherein the value is generated by a random number generator that generates a random number every time the logical block address is to be written to.

27. The storage module of claim 24, wherein the initialization vector is based also on a cryptographic salt, wherein the one or more controllers are further configured to generate the cryptographic salt, wherein the cryptographic salt is generated during production time of the storage module along with a system key, and wherein the cryptographic salt and the system key are updated together.

28. The storage module of claim 27, wherein the cryptographic salt is located in the least significant digits of the initialization vector.

29. The storage module of claim 27, wherein positions of bits of the record identifier, value, and cryptographic salt in the initialization vector are mixed based on a constant formula or variable input.

30. The storage module of claim 24, wherein the initialization vector and value are stored as metadata for the data.

31. The storage module of claim 24, wherein the memory is a NAND memory.

32. The storage module of claim 24, wherein the storage module is a solid-state drive.

33. The storage module of claim 24, wherein the storage module is embedded in a host.

34. The storage module of claim 24, wherein the storage module is removably connected to a host.

35. A storage module comprising:
a memory;
means for encrypting the data at least in part by using an initialization vector, wherein the initialization vector is based on a logical block address to which the data is to be written and a value that changes every time that the logical block address is to be written to, wherein the initialization vector is different every time the logical block address is written to because the initialization vector is based on the value that changes every time that the logical block address is written to; and
means for storing the encrypted data in the memory, wherein the memory stores at least one previously-stored version of the data marked as obsolete, wherein the encrypted data and the at least one previously-stored version are each associated with the same logical block address but with different initialization vectors, and wherein the different initialization vectors protect against a known plain text attack by preventing differences from being identified between the encrypted data and the at least one previously-stored version; wherein the means for encrypting and the means for storing are implemented by one or more controllers that include a hardware component.

36. The storage module of claim 35, wherein the value is generated by a counter that increments every time the logical block address is to be written to.

37. The storage module of claim 35, wherein the value is generated by a random number generator that generates a random number every time the logical block address is to be written to.

38. The storage module of claim 35, wherein the initialization vector and value are stored as metadata for the data.

39. The storage module of claim 35, wherein the memory is a NAND memory.

40. The storage module of claim 35, wherein the storage module is a solid-state drive.

41. The storage module of claim 35, wherein the storage module is embedded in a host.

42. The storage module of claim 35, wherein the storage module is removably connected to a host.

43. The storage module of claim 35, wherein the initialization vector is based also on a cryptographic salt, and wherein the storage module further comprises means for generating the cryptographic salt, wherein the cryptographic salt is generated during production time of the storage module along with a system key, and wherein the cryptographic salt and the system key are updated together.

* * * * *